(12) United States Patent
Jin et al.

(10) Patent No.: US 7,127,716 B2
(45) Date of Patent: Oct. 24, 2006

(54) METHOD OF LOAD BALANCING A DISTRIBUTED WORKFLOW MANAGEMENT SYSTEM

(75) Inventors: Li-Jie Jin, Mountain View, CA (US); Fabio Casati, Palo Alto, CA (US); Ming-Chien Shan, Saratoga, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 830 days.

(21) Appl. No.: 10/074,799

(22) Filed: Feb. 13, 2002

(65) Prior Publication Data

US 2003/0153994 A1 Aug. 14, 2003

(51) Int. Cl.
G06F 9/46 (2006.01)
G06F 15/16 (2006.01)
G06F 9/44 (2006.01)
G05B 15/00 (2006.01)

(52) U.S. Cl. .................. 718/105; 709/202; 709/226; 705/7; 700/1

(58) Field of Classification Search ........ 718/100–108; 705/1, 8–9, 7; 709/202, 226; 700/1
See application file for complete search history.

(56) References Cited

U.S. PATENT DOCUMENTS

| | | | |
|---|---|---|---|
| 5,504,894 A * | 4/1996 | Ferguson et al. | 707/2 |
| 5,993,038 A * | 11/1999 | Sitbon et al. | 709/202 |
| RE37,811 E * | 7/2002 | Sitbon et al. | 700/1 |
| 6,466,978 B1 * | 10/2002 | Mukherjee et al. | 709/225 |
| 6,601,035 B1 * | 7/2003 | Panagos et al. | 705/8 |
| 6,772,407 B1 * | 8/2004 | Leymann et al. | 717/100 |
| 6,986,139 B1 * | 1/2006 | Kubo | 718/105 |
| 7,035,808 B1 * | 4/2006 | Ford | 705/7 |
| 7,062,768 B1 * | 6/2006 | Kubo et al. | 718/105 |
| 2002/0188650 A1 * | 12/2002 | Sun et al. | 709/105 |
| 2005/0091657 A1 * | 4/2005 | Priem | 718/104 |

OTHER PUBLICATIONS

Lin et al., "Load Balancing in Distributed Workflow Management System", ACM, 2001, pp. 522-530.*
Ferrari et al., "A Load Index for Dynamic Load Balancing", IEEE, 1986, pp. 684-690.*

* cited by examiner

Primary Examiner—Lewis A. Bullock, Jr.
Assistant Examiner—Jennifer N. To

(57) ABSTRACT

A method of distributing workload in a workflow management system includes the step of calculating a load index for each engine of the workflow management system. The load index is calculated as an average activity execution delay attributable to the associated engine. The load indices indicate average execution latency between the start of consecutive activity nodes of a process due to engine loading exclusive of resource execution time. Workload is distributed across the plurality of engines in a load sensitive mode. In one embodiment, distribution switches from a load insensitive mode to a load sensitive mode for distributing processes when a maximum differential load index exceeds a first pre-determined threshold. Distribution switches from the load sensitive mode back to the load insensitive workload distribution mode for distributing processes when the maximum differential load index is less than a second pre-determined threshold.

25 Claims, 6 Drawing Sheets

METHOD OF LOAD BALANCING A DISTRIBUTED WORKFLOW MANAGEMENT SYSTEM

FIELD OF THE INVENTION

This invention relates to the field of workflow execution load balancing in a distributed workflow management environment.

BACKGROUND OF THE INVENTION

Workflow management systems are used to monitor an organization's various administrative and production processes. These processes are defined in terms of activities, links, routing controls, resources, initiators, terminators, and the input and output process data.

For a given process instance, the workflow management system might record information about the activities performed, when these activities are performed, time used to perform the activity, the identity of any resources involved in the activities, the outcome, and other data related to execution of the activities. This information is recorded as log data to permit subsequent reporting. Through various reporting tools the information is summarized and provided to analysts, workflow design, system administrator or other entities.

Typical workflow management systems permit users to query the execution state of a running process, report the number of process instances started or completed within a given time period, or compute simple statistics about groups of instances of a given process.

The workflow management system should be scalable to accommodate growth or shrinkage of the volume of work. In order to achieve scalability, some form of load balancing is required. Although a round robin scheduling system may be used, such a scheduling approach balances workload evenly only in homogeneous workflow management systems with uniform workload and resource capabilities. Such an approach fails to equitably balance the load across a heterogeneous collection of workflow management systems having different resources and capabilities.

SUMMARY OF THE INVENTION

In view of limitations of known systems and methods, methods for distributing workload in a workflow management system are described.

One method includes the step of calculating a load index for each engine of the workflow management system, wherein each load index reflects a workload of its associated engine. The load index is computed as an average activity execution delay attributable to the workflow engine. This load index reflects an average execution latency (or change in average execution latency) between consecutive nodes of a process (i.e., the time that will pass before the workflow engine can initiate execution of the next node due to loading of the workflow engine and exclusive of resource execution times). The workload is distributed across the plurality of engines in a load sensitive mode.

Another method operates in a load insensitive workload distribution mode for distributing processes until a maximum differential load index exceeds a pre-determined threshold. The distribution method then operates in a load sensitive workload distribution mode for distributing processes until all processes have completed execution once the maximum differential load index exceeds the pre-determined threshold.

Yet another method switches from a load insensitive mode to a load sensitive workload distribution mode for distributing processes when a maximum differential load index exceeds a first pre-determined threshold, T1. The distribution method switches from the load sensitive mode to the load insensitive workload distribution mode for distributing processes when the maximum differential load index is less than a second pre-determined threshold, T2. In one embodiment T1=T2. In an alternative embodiment, T1>T2.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Processes may be modeled as a directed graph having at least four types of nodes including activity nodes, route nodes, start nodes, and completion nodes. A process definition can be instantiated several times and multiple instances may be concurrently active. Activity executions can access and modify data included in a case packet. Each process instance has a local copy of the case packet.

Figure 1:
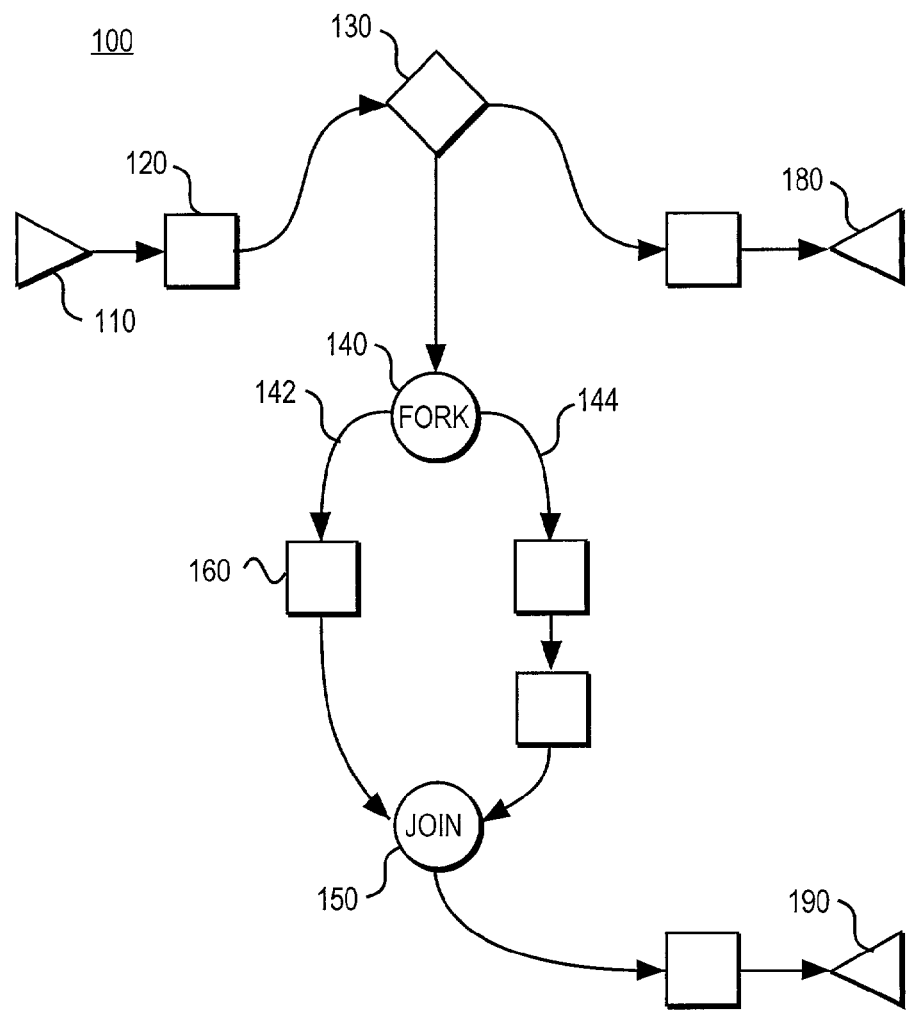
FIG. 1 illustrates an embodiment of a product manufacturing process.

FIG. 1 illustrates one embodiment of a process defined by a directed graph of nodes. The process is defined as a collection of nodes and input and output parameters. The process definition indicates how the nodes are connected to each other. The process definitions are stored in a database that can be accessed by a workflow engine.

Node 110 represents a start node. The start node defines the entry point to the process. Each hierarchical definition level has at least one start node. Nodes 180 and 190 are completion nodes. A process may have more than one completion node at a given hierarchical level.

Nodes 120 and 160 are examples of activity nodes. In some cases, an activity node may itself be further decomposed (i.e., introducing another hierarchical level) into another directed graph of nodes rather than a single atomic activity. If this is the case, the activity node may be referred to as a service node.

A service is analogous to a procedure or subroutine in an application program. The term "service" permits a convenient reference by name to a specific graph of activities and decisions without re-iterating these individual components each time. For convenience sake, the series of activities associated with a service may be invoked by referring to the service instead of the component sequence of tasks each time. The introduction of services enables a single definition to be re-used multiple times within the same process or in multiple processes. Thus a service may be used multiple times by a given process or by more than one process.

An activity node represents the invocation of a service or activity. Each activity node is associated with a description that defines the logic for selecting a resource or resource group to be invoked for executing the work. This definition also identifies the data items to be passed to the resource upon invocation (e.g., execution parameters or input data) and the data items to be received from the resource upon completion of the work (e.g., status values, output data).

Node 130 represents a route or decision node. Route nodes are decision points that control the execution flow among nodes based on a routing rule.

Nodes 140 and 150 also control execution flow. Node 140 represents a fork in the execution flow. The branches 142, 144 may continue concurrently. Node 150 represents a joining of branches into a single flow. Once either branch is active, no flow execution beyond the join can occur until each preceding branch connected to the join has completed. Join nodes and fork nodes are special types of decision nodes.

Figure 2:
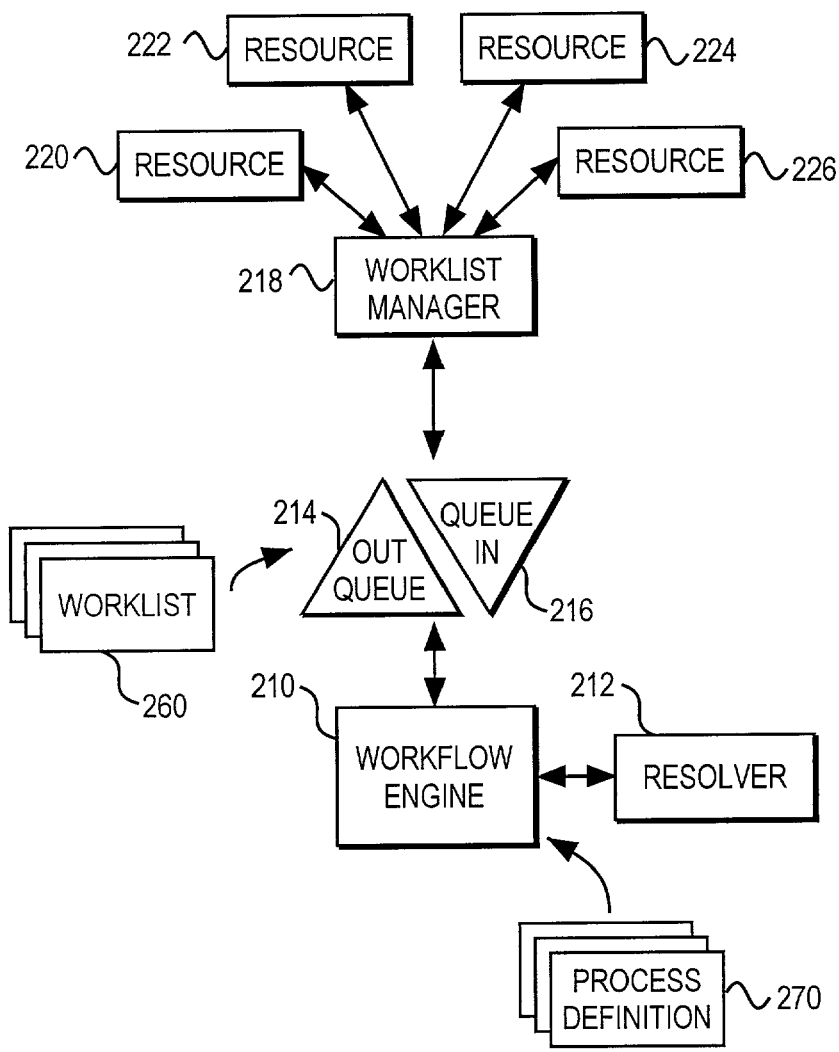
FIG. 2 illustrates one embodiment of a workflow management system.

FIG. 2 illustrates one embodiment of a workflow management system for managing the utilization of resources during process execution. The workflow management system includes workflow engine 210. The workflow engine controls the execution of a process.

The workflow engine may refer to a database to identify a process definition 270 which indicates the individual components (e.g., activities) of a requested process. The workflow engine steps through the process definition to determine the sequence in which activities are performed. When executing a process, the process engine steps through the process definition to determine which activity should be performed next, and uses the resource resolver 212 to assign a resource (220–226) to the activity.

The resolver is responsible for assigning specific resource(s) to be used for execution of activities in a specific process. Thus the resolver identifies the unique address or location of the resource (e.g., specific vendor, specific employee, specific piece of equipment, etc.) to be used to perform the activity. Different resources may be assigned to the same activity for different instantiations of the same process. The workflow engine 210 generates worklists 260 based on the information provided by the resolver 212.

Message queues 214 and 216 buffer incoming and outgoing workflow engine messages. The worklists 260 are placed in an outgoing queue 214 for execution. Each worklist identifies a sequence of tasks to be performed by a specific resource. Resources thus access their worklists 260 from the outgoing queue 214. Once the resource performs the activity, information about the completed activity or work is provided to the workflow engine 210 via the incoming message queue 216.

The worklist manager 218 is the resource management component. The worklist manager provides the worklists to the resources and collects processed work items from the resources. The worklist manager 218 ensures that each resource accesses only the worklist specifically assigned to that resource. The worklist manager 218 and the workflow engine 210 form a Process Unit.

Each process, PROC, is composed of a set of activities such that the activity component of the process may be defined as PROC={$a_i$|i=1,2, . . . j}. For a specific instance of the process, PROC={$a_i$|i=1,2, . . . m}, where m may be greater than, equal to, or less than j depending upon the execution paths selected by routing nodes.

The execution time for a specific instance of a process, $T_{PROC}$, may be calculated as $$\sum_{p=1}^{m} T_{a_p},$$

where $T_{a_p}$ is the time interval between the start of activity p-1 and activity p. For a given p, the time interval can be decomposed into a component contributed by the resource execution time ($T_{a\_resource}$) and the engine execution time, ($T_{a\_engine}$) as follows:

$$T_a = T_{a\_resource} + T_{a\_engine}$$

As the number of concurrently executing processes increases, the execution latency between two consecutive activities (e.g., $a_p$, $a_{p+1}$) tends to increase (i.e., $T_{a_p}$ increases as the number of concurrently executing processes increases) due to the contention experienced by the workflow engine. Thus consecutive activities experience an execution latency when the number of processes sharing the workflow engine increases. Although this increased latency time may be a suitable indicator for load leveling, $T_{a\_engine}$ cannot ordinarily be determined from $T_a$. Moreover, the use of $T_a$ itself ordinarily may be a poor measure of workload contention since $T_{a\_resource}$ is a significant component of $T_a$ and is not affected by the workload level of the workflow engine.

In order to measure the component of process execution time attributable to the workflow engine, a calibration mode is used with a model of the actual process. The activities of the calibration process might use resources to perform simple calculations but no time intensive operations such that $T_{a\_resource_p} \ll T_{a\_engine_p}$ for a given activity, p. This implies $T_{a_p} \approx T_{a\_engine_p}$ for a given activity p. During calibration:

$$T_{PROC} = \sum_{p=1}^{m} T_{a_p}$$

$$= \sum_{p=1}^{m} T_{a\_resource_p} + T_{a\_engine_p}$$

$$\approx \sum_{p=1}^{m} T_{a\_engine_p} = T_{ENGINE}$$

due to the definition of activities such that $T_{a\_resource_p} \ll T_{a\_engine_p}$ for each activity. Thus the process execution time during calibration is effectively the workflow engine execution time. By collecting workflow engine execution time for different numbers of consecutively executing processes, a relationship between the execution latency (λ) and the number of concurrently executing processes (n) can be derived for the purpose of defining a load index.

Figure 3:
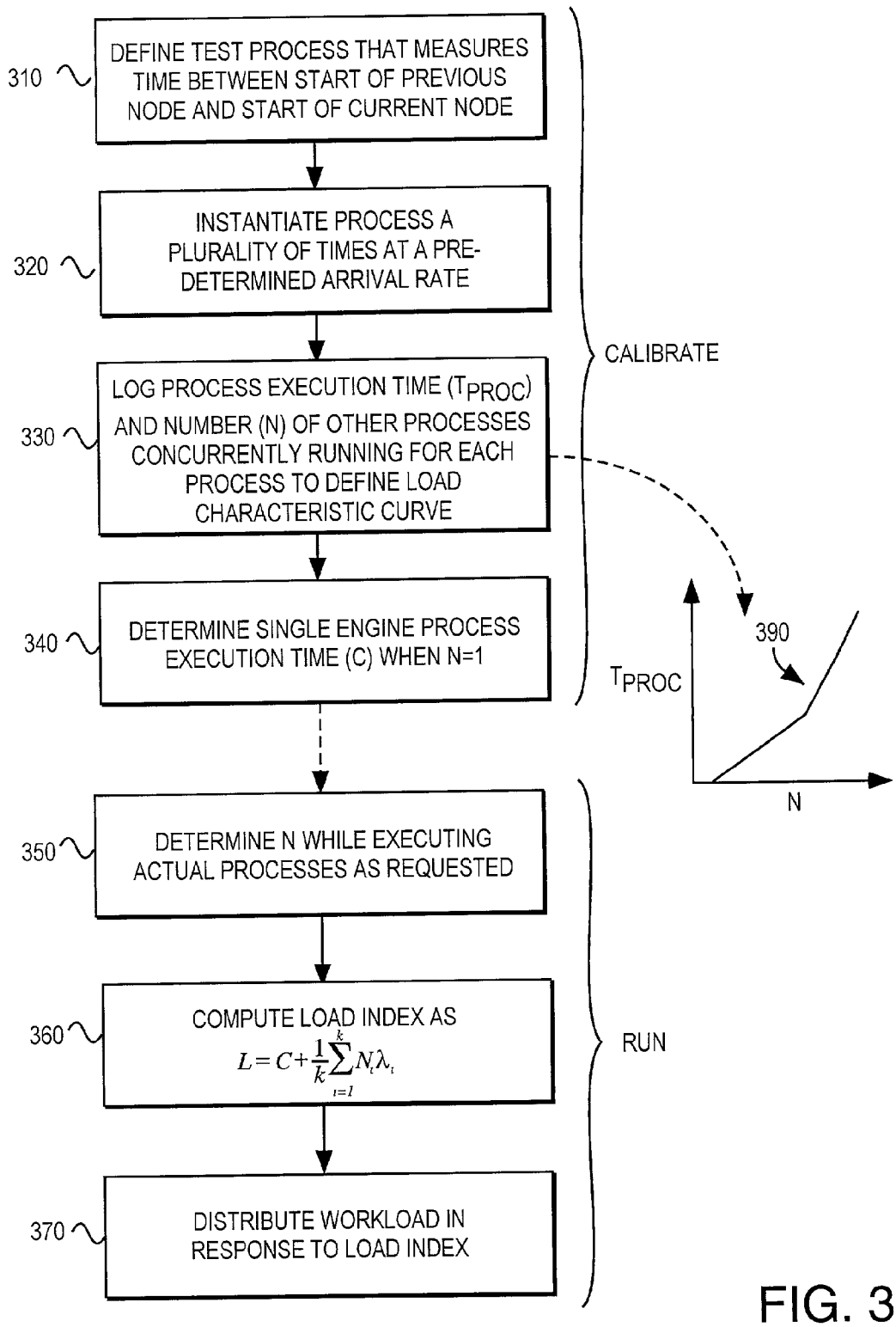
FIG. 3 illustrates a method of calculating a load index for a single engine.

FIG. 3 illustrates a method of calculating a load index of a given engine. Empirical data is collected in a calibration phase for use when the workflow engine is running in normal phase. In the calibration phase, a test process is defined in step 310. The test process uses resources to perform the activities comprising the process definition. These activities are designed to utilize resources so that the resource component ($T_{a\_resource_p}$) of the activity execution time ($T_{a_p}$) is significantly less than the processing time required by the workflow engine ($T_{a\_engine_p}$).

In one embodiment, the test process is a three node process (i.e., start node, activity node, completion node) that is designed predominately to measure the time between the start of a preceding node and the start of the current node. Thus the output data includes information such as the elapsed time between the beginning of the execution of the activity node and the completion node.

In step 320, the test process is instantiated a plurality of times at a pre-determined arrival rate. The process execution time ($T_{PROC}$) and the associated number (n) of active processes (i.e., started but not completed) at the time the current process is instantiated are recorded in step 330. The logged data pairs (n, $T_{PROC}$) define a load characteristic curve 390. $T_{PROC}$ tends to increase as n increases and thus may be expressed as a function of n. (i.e., $T_{PROC}$ (n)).

A process execution latency rate $\lambda$ can be calculated as follows:

$$\lambda(n) = \frac{\Delta T_{PROC}(n)}{\Delta n}$$

where n is the number of active processes. The process execution time when a single process is running is calculated in step 340 (i.e., $C=T_{PROC}(1)$). The term "C" represents the single engine nominal activity execution delay experienced when no other processes or activities are active.

As the number of concurrent activities that the workflow engine is handling increases, the execution delay between consecutive activities of the same process will also increase due to loading.

Although the load could be estimated as a function of the number of active processes, estimating the load as a function of the number of active activities provides greater accuracy and flexibility.

A single process may have numerous activities concurrently executing. Mere knowledge of the number of processes executing without accounting for the activities being executed by each process can provide an accurate estimation of the true load only if workflow engine contention is substantially linear and only if each process has a single activity executing at a given time.

In contrast, the number of active activities can be used to estimate loading regardless of which processes those activities are associated with. Moreover, the use of the number of active activities to estimate a load index enables accurate estimation even if the workflow engine is handling a heterogeneous mix of processes.

Activities are presumed to require substantially the same workflow engine execution time in the absence of any loading contention or time consuming data transfers. In this particular example, given that the first and last nodes contribute insignificantly to the process execution time, the calibration process execution time, $T_{PROC}$, may be characterized as an activity execution time for the second node. The load characteristic curve 390 is thus equivalently a load characteristic curve that reflects loading as a function of the number of active activities. The advantage of using the three node calibration process is that the process execution latency rate effectively represents an activity execution latency rate that can be used for load index computations.

After acquiring the empirical data in the calibration phase, a load index for normal operation of the workflow engine based on activity count can be determined. In one embodiment, the load index is defined as follows:

$$L_1 = \frac{1}{k}\sum_{i=1}^{k}(N_i\lambda_i + C)$$

$$= C + \frac{1}{k}\sum_{i=1}^{k}N_i\lambda_i$$

where k is the total number of activities completed during a pre-determined time period (not including start and completion nodes). N is the total number of activities (not including start and completion nodes) other than activity i that are active at the time activity i is accounted for. The activity execution latency rate $\lambda$ for activity i is a function of N and is determined from the empirical data collected during calibration. The resulting load index is essentially an estimate of average activity execution delay attributable to the workflow engine. This load index estimates the total average delay between consecutive nodes of a process (i.e., the time that will pass before the workflow engine can initiate execution of the next node) due to loading of the workflow engine and exclusive of resource execution times.

The number of other concurrently executing activities N is tracked while executing actual processes as requested in step 350. The load index is calculated in step 360. The term $N_i\lambda_i$ reflects the increase in nominal activity execution delay, C, resulting from the increasing number of active activities. $N_i$ is determined at the time the activity i is commenced. Similarly, $\lambda_i$ is evaluated as $\lambda_i=\lambda(n)|_{n=N_i}$. In various embodiments, the load index is calculated for a plurality of pre-determined time periods. For example, distinct load indices may be calculated for one minute, three minute, and five minute windows.

The load index may alternatively be calculated as the average activity execution delay as follows:

$$L_2 = \frac{1}{k}\sum_{i=1}^{k}N_i\lambda_i$$

This calculation reflects the change in the nominal delay "C". The offset term "C" may not be required if the load index is merely being compared to a threshold for workload distribution decisions. Similarly, the term "C" is irrelevant if only differential workload indices are used for workload distribution decisions. The load indices are a measure of the average execution latency (i.e., the time incurred) between the workflow engine's start of consecutive activity nodes of a process exclusive of resource execution times. The "C" term reflects the inherent delay without loading. The other term reflects the increase in the average delay due to handling other activity nodes. This load index estimates the relative average delay between consecutive nodes of a process (i.e., the time that will pass before the workflow engine can initiate execution of the next node) due to loading of the workflow engine and exclusive of resource execution times and nominal activity execution delays. $L_1$ reflects the total average activity execution delay while $L_2$ reflects the relative average activity execution delay with respect to C.

For multiple workflow engines, the load index must be updated frequently to accurately track the load at any time. When more than one engine is present the nomenclature L(i) is used to identify the load index for engine i. In the event a multiple engine workflow management system is used, the workload may be distributed in step 370 based on the load index.

Figure 4:
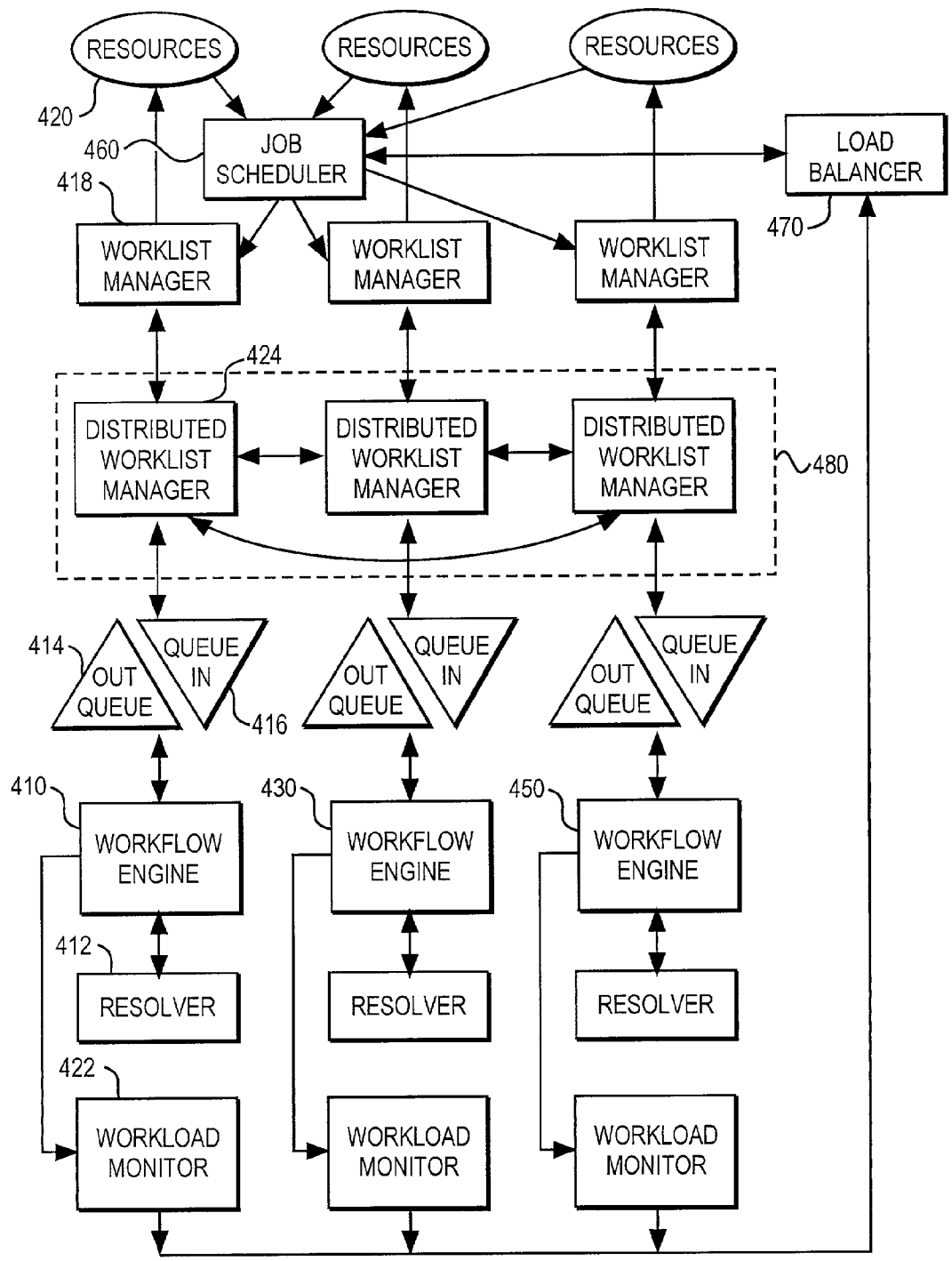
FIG. 4 illustrates one embodiment of a workflow management system with a plurality of engines.

FIG. 4 illustrates one embodiment of a workflow management system with a plurality of workflow engines 410, 430, 450. Each engine 410 responds to a request to perform a desired process using an associated resolver 412 to identify specific resources for the purpose of generating resource worklists. The worklists are placed in an outgoing queue 414 associated with the selected engine 410 so that the worklist manager 418 can ultimately ensure access to the worklists by the resources 420.

In the multi-engine environment, each workflow engine 410 is monitored by a workload monitor 422. Each associated workflow engine 410, resolver 412, and worklist manager 418 forms a process unit.

A process instance is the basic job unit to be scheduled among available process units. The workload monitor 422 associated with each process unit is responsible for collecting load information from its associated process unit. The load balancer 470 is the load balancing policy carrier and executor. The load balancing job scheduler 460 is responsible for allocating process instances to a process unit selected by the load balancer 470 in response to the load information provided by the workload monitors.

The job scheduler maintains a job ready queue. Under certain load conditions, the load balancer 470 may identify a process unit that cannot actually accept the process without reducing its performance below a pre-determined threshold. In this case the processes are held in the job ready queue until they can be accepted by the identified process unit without reducing the performance as described.

Each process unit has an associated distributed worklist manager 424. The distributed worklist managers 480 are capable of communicating with each other. Unlike the single engine case, the worklist managers 418 of each process unit receive their worklists from the associated distributed worklist manager 424 rather than the out queues 414.

In a multiple process unit workflow management system, process instances of a business process may be scheduled to run on different process units in accordance with system workload distribution and load balancing policies. A resource, however, may need to execute work items of the process instances executing on different process units. Instead of requiring the resources to examine each worklist manager, the distributed worklist managers are designed to present a virtual consistent worklist image for process initiators and resources. Thus, for example, the distributed worklist managers collect and distributed worklist information about processes running on one process unit that use resources typically associated with another process unit. The distributed worklist managers permit scaling flexibility without having to modify resources or worklist managers as the process unit or resource configuration changes.

In one embodiment, the resources are capable of accessing any worklist manager to obtain the appropriate worklist. In one embodiment, each resource always refers to a default worklist manager for accessing its worklist.

The sensed load index is a measure of the load on a given process unit. The sensed load index of each process unit or the relative difference in load indices between process units can be used to both prioritize process units for offloading processes and identify process units that the offloaded processes should be moved to. Although the workload monitors collect the information necessary to compute a load index for the associated process units, the load balancing policy is implemented by the load balancer 470.

Figure 5:
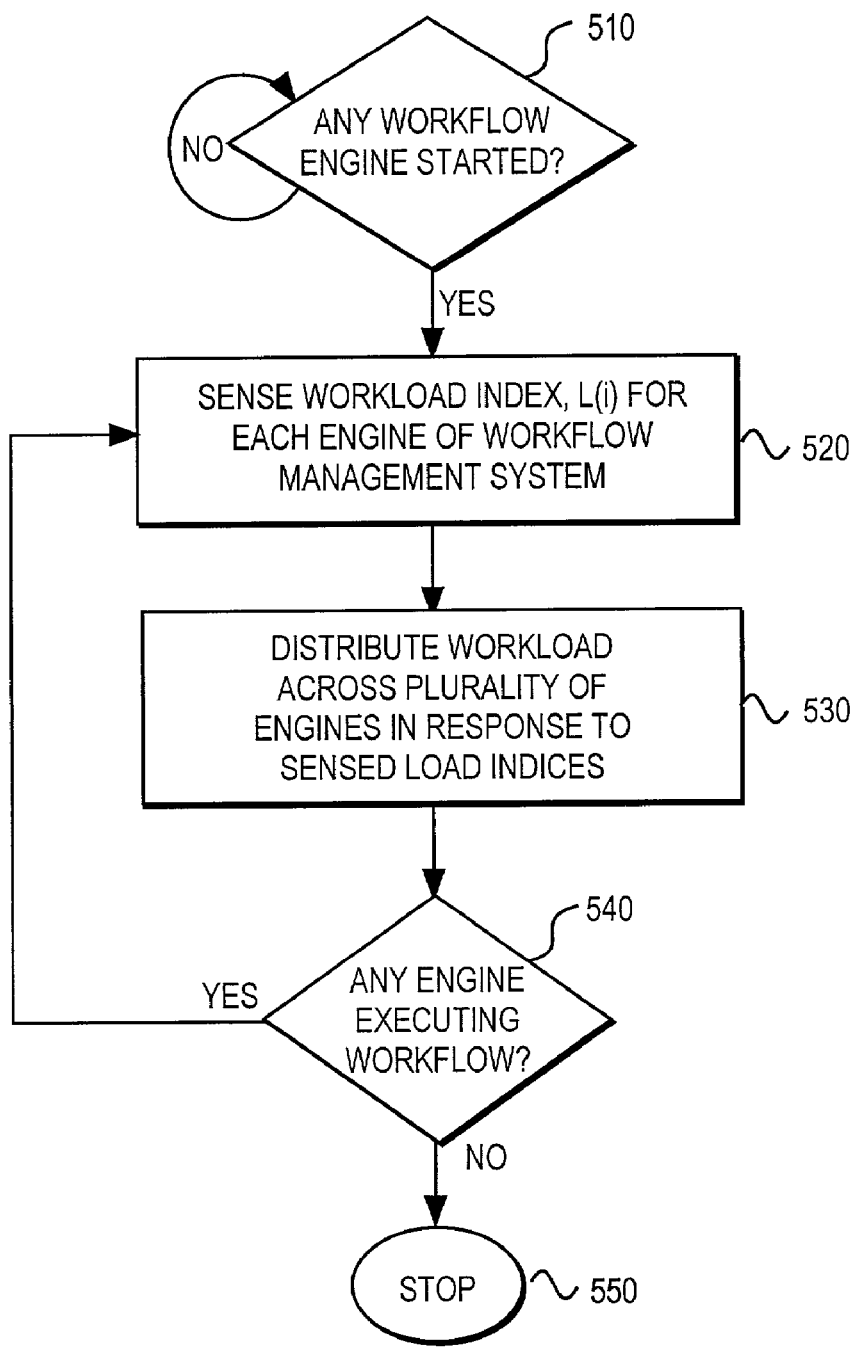
FIG. 5 illustrates one embodiment of a method for distributing workload across a plurality of engines.

FIG. 5 illustrates one embodiment of a method for distributing workflow based on the sensed load index. Once at least one of the workflow engines has started as determined by step 510, the load index, L(i), for each engine of the workflow management system is sensed in step 520. In various embodiments, the load index is computed as either an average activity execution time or an average activity execution delay. The length of the pre-determined time period over which the average activity execution time (i.e., $L_1(i)$) or the average activity execution delay (i.e., $L_2(i)$) is calculated will depend upon the type of process. In one embodiment, for example, L(i) is calculated over a 1 minute period. In alternative embodiments, L(i) is calculated after a threshold number of processes have been instantiated.

In step 530, the workload is distributed across the plurality of workflow engines in accordance with the sensed load index. In one embodiment, the workload distribution is prioritized based on an increasing load index ranking of the workflow engines. Thus, for example, new instantiations of a process are directed to the workflow engine with the lowest load index at the time the process arrives. In an alternative embodiment, queued workflow may be re-distributed based on the relative difference in load indices between the engines.

The load balancing process of sensing and adjusting the load in response to the sensed load indices (i.e., steps 520–530) continues as long as any engine is still executing workflow as determined by step 540.

Figure 6:
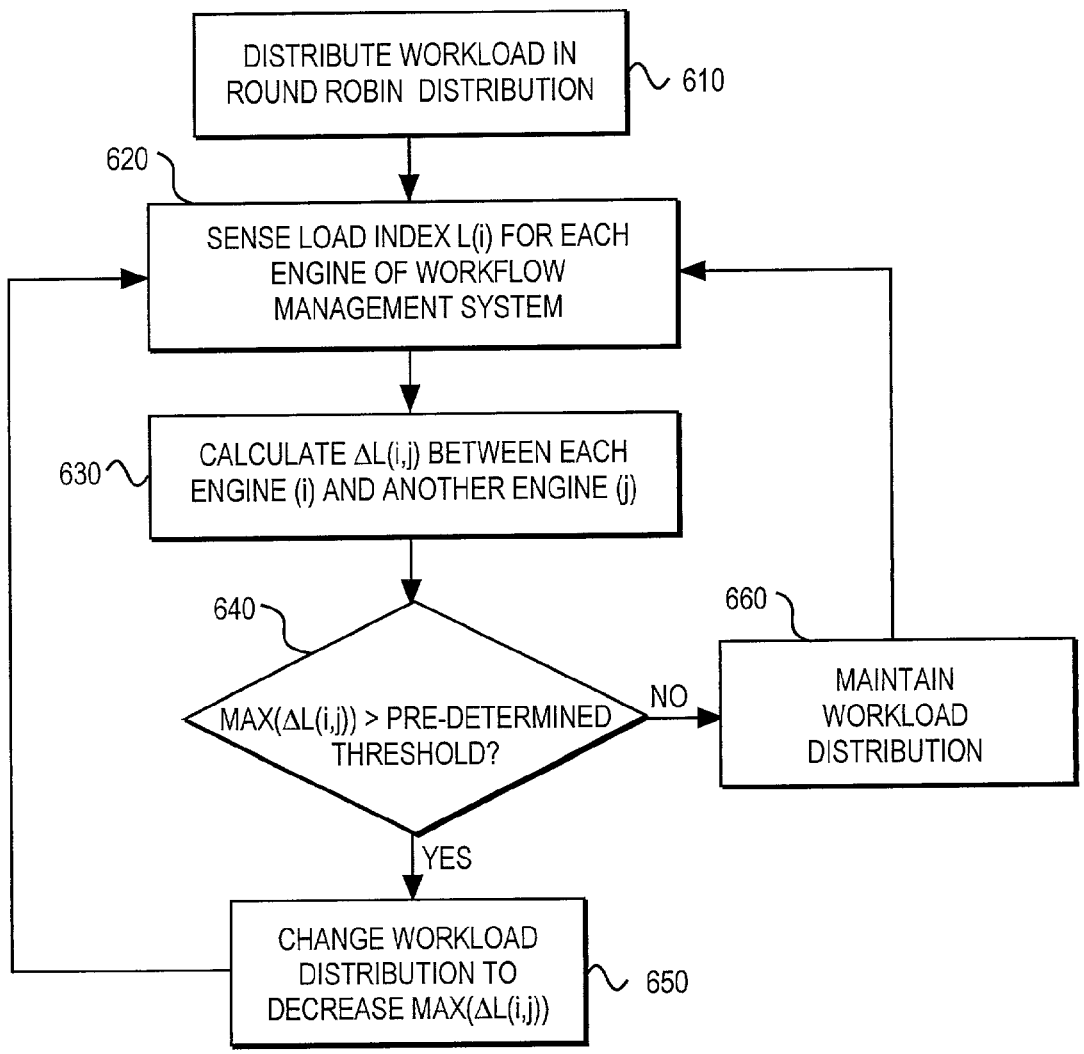
FIG. 6 illustrates an alternative embodiment of a method for distributing workload across a plurality of engines.

FIG. 6 illustrates an alternative embodiment of a method for distributing workflow based on the sensed load index. Generally, one distribution or load balancing process is used until the difference in workloads across the engines exceeds a pre-determined threshold. Once this threshold is exceeded, another distribution process is used. In the illustrated embodiment, the individual load indexes are examined to distribute the workloads across the engines so as to decrease the maximum difference between the load indexes of different process units.

Thus the mode of workflow distribution varies in accordance with the differential load index. In one mode, the distribution is insensitive to the individual load indices. In the other mode, the distribution is sensitive to the individual load indices or at least a relative difference between the individual load indices.

Referring to FIG. 6, when processes are initially instantiated on the workflow management system, the processes are distributed across the plurality of engines in a round robin fashion (i.e., load insensitive) in step 610. A load index, L(i), is sensed or calculated for each of the n engines in step 620. In step 630, the difference in load indices is calculated between each engine and the other engines to form the differential load index set, $\Delta L(i,j)$ for $i,j \epsilon 1, \ldots n$. In one embodiment, $\Delta L(i,j)=L(i)-L(j)$.

To prioritize the engines for either offloading the current workload or re-directing new process instantiations, the maximum $\Delta L(i,j)$ (i.e., $MAX(\Delta L(i,j))$) is identified in step 640. Another method of calculating this value is to simply calculate the difference between the maximum and minimum load indices for the engines (i.e., $MAX(L(i))-MIN(L(i))$). The other differential values, however, may be useful for prioritizing or specifying the distribution of the workload across the multiple engines.

Thus for example, source engines may be prioritized for distributing workload from based on a maximum differential load index. Similarly, target engines may be identified for distributing workload to based on the load indices. In one embodiment, for a given $MAX(\Delta L(i,j))$, i indicates the source engine prioritized for distributing workload and j indicates the best candidate target engine.

If MAX(ΔL(i,j)) exceeds a pre-determined threshold as determined by step 640, then step 650 distributes the workload across the plurality of engines in a manner designed to reduce MAX(ΔL(i,j)). In one embodiment, process instantiations are distributed in a manner (i.e., load sensitive) other than the round robin distribution as requests for the instantiations arrive (i.e., new distribution method for incoming processes). In an alternative embodiment, queued process instantiations pending with engine i (where i is determined from MAX(ΔL(i,j))) may be re-assigned to another engine (i.e., re-distribution of pending processes).

If MAX(ΔL(i,j)) does not exceed the predetermined threshold, then the workload distribution is maintained as indicated in step 660. If the workload was initially distributed in a round robin fashion, step 660 ensures the workload will continue to be distributed in such a fashion until such a time as the pre-determined threshold (T1) is exceed.

As illustrated, once the workload distribution switches from load insensitive to a load sensitive mode, the load sensitive mode is maintained until all the processes have terminated (i.e., one-way switching). In an alternative embodiment, however, the mode of distribution switches back to round robin once the maximum differential load index falls below another pre-determined threshold (T2) (i.e., two-way switching). Although the first and second pre-determined thresholds might be the same (T1=T2), some form of hysteresis may be desirable to avoid frequent two-way switching. Thus in one embodiment, T1≠T2 and T1>T2. Steps 620–660 are repeated until all the instantiated processes have terminated.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method of distributing workload in a workflow management system comprising the steps of:
    during a calibration mode, executing plural instantiations of a test process to identify load index parameters;
    calculating a load index based on the load index parameters for each of a plurality of engines of the workflow management system, wherein each load index reflects a workload of its associated engine, wherein the load index corresponds to an average activity execution delay; and
    distributing workload across the plurality of engines in response to the load indices in a load sensitive mode, wherein identifying the load index parameters comprises identifying a single engine nominal activity execution delay (C) when no concurrent activities are executing and an activity execution latency factor (λ), wherein λ is a function of a number of concurrently executing activities.

2. The method of claim 1 wherein calculating the load index comprises calculating the load index for each engine j as a total average activity execution delay $$L(j) = C + \frac{1}{k}\sum_{i=1}^{k} N_i \lambda_i,$$

wherein k is a total number of activities completed within a pre-determined time period for engine j, wherein $N_j$ is the number of other concurrently executing processes at the time activity i is executing, wherein $\lambda_i$ is an execution latency rate for activity i.

3. The method of claim 1 wherein calculating the load index comprises calculating the load index for each engine j as a relative average activity execution delay $$L(j) = \frac{1}{k}\sum_{i=1}^{k} N_i \lambda_i,$$

wherein k is a total number of activities completed within a pre-determined time period for engine j, wherein $N_j$ is the number of other concurrently executing activities at the time activity i is executing, wherein $\lambda_i$ is an execution latency rate for activity i.

4. The method of claim 1 wherein distributing the workload comprises re-directing incoming process requests to another engine.

5. The method of claim 1 wherein distributing the workload comprises re-distributing queued processes to another engine.

6. The method of claim 1 wherein distributing the workload comprises prioritizing a source engine for distributing workload from based on a maximum differential workload.

7. The method of claim 1 wherein distributing the workload comprises identifying a target engine to which workload is to be distributed based on a maximum differential workload.

8. The method of claim 1, wherein the plural instantiations of the test process are executed during the calibration mode to increase loading on each workflow engine to enable identification of the load index parameters.

9. A method of distributing workload in a workflow management system comprising the steps of:
    a) calculating a load index for each engine of the workflow management system, wherein each load index reflects a workload of its associated engine;
    b) operating in a load insensitive workload distribution mode for distributing processes among the engines in a first distribution fashion that is insensitive to the load indices until a maximum differential load index exceeds a pre-determined threshold; and
    c) operating in a load sensitive workload distribution mode for distributing processes among the engines in a second distribution fashion that is sensitive to the load indices until all processes have completed execution once the maximum differential load index exceeds the pre-determined threshold.

10. The method of claim 9 wherein processes are round-robin distributed in the load insensitive work-load distribution mode.

11. The method of claim 9 wherein step a) further comprises the step of calculating the load index for each engine j as a total average activity execution delay $$L(j) = C + \frac{1}{k}\sum_{i=1}^{k} N_i \lambda_i,$$

wherein k is a total number of activities completed within a pre-determined time period for engine j, wherein $N_j$ is the number of other concurrently executing processes at the time activity i is executing, wherein $\lambda_i$ is an execution latency rate for activity i, wherein C is a single engine nominal activity execution delay when no concurrent activities are executing.

12. The method of claim 9 wherein step a) further comprises the step of calculating the load index for each engine j as a relative average activity execution delay $$L(j) = \frac{1}{k}\sum_{i=1}^{k} N_i \lambda_i,$$

wherein k is a total number of activities completed within a pre-determined time period for engine j, wherein $N_j$ is the number of other concurrently executing activities at the time activity i is executing, wherein $\lambda_i$ is an execution latency rate for activity i.

13. The method of claim 9 wherein step c) further comprises the step of re-directing incoming process requests to another engine.

14. The method of claim 9 wherein step c) further comprises the step of re-distributing queued processes to another engine.

15. The method of claim 9 wherein step c) further comprises the step of prioritizing a source engine for distributing workload from based on a maximum differential workload.

16. The method of claim 9 wherein step c) further comprises the step of identifying a target engine for distributing workload to based on a maximum differential workload.

17. A method of distributing workload in a workflow management system comprising the steps of:
   calculating a load index for each engine of the workflow management system, wherein each load index reflects a workload of its associated engine;
   switching from a load insensitive workload distribution mode to a load sensitive workload distribution mode for distributing processes among the engines in a first distribution fashion that is sensitive to the load indices when a maximum differential load index exceeds a first pre-determined threshold, T1; and
   switching from the load sensitive workload distribution mode to the load insensitive workload distribution mode for distributing processes among the engines in a second distribution fashion that is insensitive to the load indices when the maximum differential load index is less than a second pre-determined threshold, T2.

18. The method of claim 17 wherein T1=T2.

19. The method of claim 17 wherein T1>T2.

20. The method of claim 17 wherein the load index for each engine j is calculated as a total average activity execution delay $$L(j) = C + \frac{1}{k}\sum_{i=1}^{k} N_i \lambda_i,$$

wherein k is a total number of activities completed within a pre-determined time period for engine j, wherein $N_j$ is the number of other concurrently executing processes at the time activity i is executing, wherein $\lambda_i$ is an execution latency rate for activity i, wherein C is a single engine activity nominal execution delay when no concurrent activities are executing.

21. The method of claim 17 wherein the load index for each engine j is calculated as a relative average activity execution delay $$L(j) = \frac{1}{k}\sum_{i=1}^{k} N_i \lambda_i,$$

wherein k is a total number of activities completed within a pre-determined time period for engine j, wherein $N_j$ is the number of other concurrently executing activities at the time activity i is executing, wherein $\lambda_i$ is an execution latency rate for activity i.

22. A method of distributing workload in a workflow management system comprising the steps of:
   during a calibration mode, executing plural instantiations of a test process to identify load index parameters;
   calculating a load index based on the load index parameters for each of a plurality of engines of the workflow management system, wherein each load index reflects a workload of its associated engine, wherein the load index corresponds to an average activity execution delay;
   distributing workload across the plurality of engines in response to the load indices in a load sensitive mode; and
   providing a definition of activities in the test process such that for each activity, a resource execution time is much less than an engine execution time, the resource execution time representing an execution time of a resource to perform work represented by the respective activity, and the engine execution time representing an execution time of the respective engine in performing the activity.

23. A workflow management system, comprising:
plural workflow engines;
workload monitors to compute load indices for the workflow engines, wherein each load index reflects a workload of the corresponding workflow engine; and
a load balancer to:
   operate in a load insensitive workload distribution mode for distributing processes among the workflow engines in a first distribution fashion that is insensitive to the load indices until at least one difference between load indices of the workflow engines exceeds a first threshold; and
   after the at least one difference between load indices exceeds the first threshold, operate in a load sensitive workload distribution mode for distributing processes among the workflow engines in a second distribution fashion that is sensitive to the load indices until at least one of:

(1) all processes have completed execution; and
(2) the at least one difference between load indices of the workflow engines is less than a second threshold.

24. The workflow management system of claim 23, wherein the load index for each engine j is a total average activity execution delay $$L(j) = C + \frac{1}{k}\sum_{i=1}^{k} N_i \lambda_i,$$

wherein k is a total number of activities completed within a pre-determined time period for engine j, wherein $N_j$ is the number of other concurrently executing processes at the time activity i is executing, wherein $\lambda_i$ is an execution latency rate for activity i, wherein C is a single engine activity nominal execution delay when no concurrent activities are executing.

25. The workflow management system of claim 23, wherein the load index for each engine j is a relative average activity execution delay $$L(j) = \frac{1}{k}\sum_{i=1}^{k} N_i \lambda_i,$$

wherein k is a total number of activities completed within a predetermined time period for engine j, wherein $N_j$ is the number of other concurrently executing activities at the time activity i is executing, wherein $\lambda_i$ is an execution latency rate for activity i.

* * * * *

UNITED STATES PATENT AND TRADEMARK OFFICE
CERTIFICATE OF CORRECTION

PATENT NO. : 7,127,716 B2  
APPLICATION NO. : 10/074799  
DATED : October 24, 2006  
INVENTOR(S) : Li-Jie Jin et al.

It is certified that error appears in the above-identified patent and that said Letters Patent is hereby corrected as shown below:

In column 10, line 8, in Claim 2, delete "$N_j$" and insert -- $N_i$ --, therefor.

In column 10, line 23, in Claim 3, delete "$N_j$" and insert -- $N_i$ --, therefor.

In column 10, line 63, in Claim 10, delete "work-load" and insert -- workload --, therefor.

In column 11, line 8, in Claim 11, delete "$N_j$" and insert -- $N_i$ --, therefor.

In column 11, line 25, in Claim 12, delete "$N_j$" and insert -- $N_i$ --, therefor.

In column 12, line 8, in Claim 20, delete "$N_j$" and insert -- $N_i$ --, therefor.

In column 12, line 25, in Claim 21, delete "$N_j$" and insert -- $N_i$ --, therefor.

In column 13, line 16, in Claim 24, delete "$N_j$" and insert -- $N_i$ --, therefor.

In column 14, line 14, in Claim 25, delete "$N_j$" and insert -- $N_i$ --, therefor.

Signed and Sealed this

Fifth Day of May, 2009

JOHN DOLL  
*Acting Director of the United States Patent and Trademark Office*